US008209684B2

(12) United States Patent
Kannan et al.

(10) Patent No.: US 8,209,684 B2
(45) Date of Patent: Jun. 26, 2012

(54) MONITORING SYSTEM FOR VIRTUAL APPLICATION ENVIRONMENTS

(75) Inventors: Raja Kannan, Chennai (IN); Srinivas Ramanathan, Canton, MI (US); Sreedharan Subramanian, Chennai (IN); Balamurugan Vaidhinathan, Franklin Park, NJ (US)

(73) Assignee: EG Innovations Pte. Ltd., Singapore (SG)

( * ) Notice: Subject to any disclaimer, the term of this patent is extended or adjusted under 35 U.S.C. 154(b) by 1346 days.

(21) Appl. No.: 11/781,156

(22) Filed: Jul. 20, 2007

(65) Prior Publication Data

US 2009/0024994 A1 Jan. 22, 2009

(51) Int. Cl.
*G06F 9/455* (2006.01)

(52) U.S. Cl. .............................. 718/1; 717/127; 717/128

(58) Field of Classification Search ........................ None
See application file for complete search history.

(56) References Cited

U.S. PATENT DOCUMENTS

| | | | | |
|---|---|---|---|---|
| 5,386,565 | A * | 1/1995 | Tanaka et al. ................ | 717/128 |
| 6,802,054 | B2 * | 10/2004 | Faraj ............................ | 717/128 |
| 7,293,260 | B1 * | 11/2007 | Dmitriev ...................... | 717/130 |
| 7,797,587 | B2 * | 9/2010 | Vasudevan et al. .......... | 714/47.1 |
| 7,856,549 | B2 * | 12/2010 | Wheeler ....................... | 713/1 |
| 7,865,876 | B2 * | 1/2011 | Griffin et al. ................. | 717/121 |
| 7,904,493 | B2 * | 3/2011 | Schmelter et al. ............ | 707/820 |
| 2002/0194496 | A1 * | 12/2002 | Griffin et al. .................. | 713/200 |
| 2003/0101245 | A1 * | 5/2003 | Srinivasan et al. ............ | 709/221 |
| 2003/0172288 | A1 * | 9/2003 | Sasage .......................... | 713/200 |
| 2005/0120341 | A1 * | 6/2005 | Blumenthal et al. .......... | 717/158 |
| 2005/0251371 | A1 * | 11/2005 | Chagoly et al. .................. | 703/1 |
| 2006/0195715 | A1 * | 8/2006 | Herington ......................... | 714/4 |
| 2006/0230105 | A1 * | 10/2006 | Shappir et al. ................ | 709/203 |
| 2006/0294439 | A1 * | 12/2006 | Rolia et al. ...................... | 714/47 |
| 2007/0033578 | A1 * | 2/2007 | Arnold et al. ................. | 717/130 |
| 2008/0098364 | A1 * | 4/2008 | Gray-Donald et al. ....... | 717/130 |
| 2009/0028053 | A1 * | 1/2009 | Kannan et al. ................ | 370/241 |

* cited by examiner

*Primary Examiner* — Emerson Puente
*Assistant Examiner* — Hiren Patel
(74) *Attorney, Agent, or Firm* — Michaud-Kinney Group LLP

(57) ABSTRACT

A monitoring system for virtual application environments comprising: at least one physical machine executing a first operating system; at least one virtual machine operating on at least one of the at least one physical machines, each such virtual machine operating a second operating system; and an agent program operating on each of the at least one physical machines, where, each agent program is operable to obtain a first set of metrics from the first operating system, such first set of metrics including metrics in respect of each virtual machine as viewed by the first operating system, and operable to connect to the second operating system of each virtual machine hosted on the physical machine the agent program operates on and obtain a second set of metrics in respect of the virtual machine from the second operating system, the agent program further operable to communicate the first and second sets of metrics to a manager program.

18 Claims, 8 Drawing Sheets

MONITORING SYSTEM FOR VIRTUAL APPLICATION ENVIRONMENTS

FIELD OF THE INVENTION

The invention relates to a monitoring system for virtual application environments. The invention is particularly suited to monitoring both internal and external factors of the virtual application environments.

BACKGROUND TO THE INVENTION

The following discussion of the background to the invention is intended to facilitate an understanding of the present invention. However, it should be appreciated that the discussion is not an acknowledgment or admission that any of the material referred to was published, known or part of the common general knowledge in any jurisdiction as at the priority date of the application.

Existing systems for monitoring virtual environments monitor the usage of critical central processing unit ("CPU"), memory and storage resources of the physical machine and characteristics of the individual virtual machines as seen from the physical machine. These latter characteristics are measured from the operating system running on the physical machine and, since they are made from outside the virtual machine concerned, are referred to in this specification as the "outside view". Using the outside view, it is possible to determine the resource usage levels of the operating system of the physical machine and the individual usage levels for each of the virtual machines.

The problem with such systems is that "outside" view information alone does not provide a complete view of the operations of the data network. Without this complete view, effective capacity planning decisions regarding the data network may not be made through ignorance of other constraining factors. Additionally, without a complete view of the operations of the data network, accurately identifying problems with the virtual machine environment of the data network is almost impossible.

To elaborate, because each virtual machine operates as an individual process on the operating system of the physical machine, but internally operates a complete operating system with individual applications, errors in one virtual machine may be propagating errors in other virtual machines. For example, if a process on one of the virtual machines starts to take up excessive CPU cycles of the physical machine this would starve other virtual machines of the limited CPU cycles available on the physical machine, resulting in application slow-downs on all the virtual machines.

Accordingly, it is an object of the present invention to overcome or at least minimise the impact of the aforementioned problems by providing an additional "inside view" of the performance of the virtual machines on the data network.

An optional secondary object of the present invention is to reduce the number of programs required by the monitoring system to obtain both the "inside view" and the "outside view" of each virtual machine. In this manner, the amount of resources consumed by the monitoring system can be minimised. Additionally, having a reduced number of agents monitoring multiple virtual machines and/or physical machines significantly reduces the overall maintenance required by the monitoring system as a whole.

SUMMARY OF THE INVENTION

Throughout this document, unless otherwise indicated to the contrary, the terms "comprising", "consisting of", and the like, are to be construed as non-exhaustive, or in other words, as meaning "including, but not limited to".

In a first aspect of the invention there is a monitoring system for virtual application environments comprising:
at least one physical machine executing a first operating system;
at least one virtual machine operating on at least one of the at least one physical machines, each such virtual machine operating a second operating system; and
an agent program operating on each of the at least one physical machines,
where, each agent program is operable to obtain a first set of metrics from the first operating system, such first set of metrics including metrics in respect of each virtual machine as viewed by the first operating system, and operable to connect to the second operating system of each virtual machine hosted on the physical machine the agent program operates on and obtain a second set of metrics in respect of the virtual machine from the second operating system, the agent program further operable to communicate the first and second sets of metrics to a manager program.

In one variation of the first aspect of the invention there is a monitoring system for virtual application environments comprising:
at least one physical machine executing a first operating system;
at least one virtual machine operating on at least one of the at least one physical machines, each such virtual machine operating a second operating system; and
an agent program operating on each of the at least one physical machines and at least one vm agent program operating on a virtual machine hosted by the physical machine,
where, the agent program is operable to obtain a first set of metrics from the first operating system, such first set of metrics including metrics in respect of each virtual machine as viewed by the first operating system and operable to connect to the second operating system of each virtual machine hosted on the physical machine, excepting the virtual machines having a vm agent program operating thereon, the agent program operates on and obtain a second set of metrics in respect of the virtual machine from the second operating system, each vm agent program operable to obtain a second set of metrics in respect of the virtual machine from the second operating system of the virtual machine on which it operates, the agent program further operable to communicate the first and second sets of metrics to a manager program and the vm agent program further operable to communicate the second set of metrics to the manager program.

In yet a further variation of the first aspect of the invention there is a monitoring system for virtual application environments comprising:
at least one physical machine executing a first operating system;
at least one virtual machine operating on at least one of the at least one physical machines, each such virtual machine operating a second operating system; and
an agent program,
where, the agent program is operable to connect to each physical machine in turn to obtain a first set of metrics from the first operating system, such first set of metrics including metrics in respect of each virtual machine as viewed by the first operating system and operable to connect to the second operating system of each virtual machine hosted on the physical machine and obtain a second set of metrics in respect of the virtual machine from the second operating system, the agent program further operable to communicate the first and second sets of metrics to a manager program.

The monitoring system of this first aspect, or its variations, may further include an application agent program, the application agent program operable to obtain a third set of metrics in respect of a pre-determined application running on the virtual machine. This then allows the system to obtain more detailed information on the status of important applications to which the application agent program is assigned to monitor. To reduce resource consumption and provide easy maintenance, the agent program may include the application agent program.

In situations where a virtual machine is acting as a virtual server for at least one virtual desktop, a vm agent program operating on such virtual machine is operable to connect to each virtual desktop and obtain a fourth set of metrics in respect of the virtual desktop and communicate the fourth set of metrics to the manager program. Alternatively, the agent program may operate to connect to each virtual desktop and obtain a fourth set of metrics in respect of the virtual desktop and communicate the fourth set of metrics to the manager program.

The manager program may execute on a physical computer system and also operate as the agent program in respect of that physical machine. Alternatively, the manager program may execute on a stand-alone device and the agent program also execute on a stand-alone device. The stand-alone device that the agent program executes on may differ from the stand-alone device the manager program executes on.

The agent program, vm agent program, and/or application agent program as appropriate, may operate to assess each metric in the respective set of metrics such agent program obtains and communicate the assessment of such sets of metrics to the manager program. Alternatively, or cumulatively, such agent program may operate to obtain and communicate the values of each such sets of metrics to the manager program Such communication may only occur in respect of those metrics considered abnormal.

In preferred arrangements of the invention"
the first set of metrics includes metrics that fall within at least one of the following categorisations: outside processor metrics; outside memory metrics; outside disk metrics; outside network metrics; outside transmission control protocol metrics; outside process-related metrics; and outside log information; AND/OR
the second set of metrics includes metrics that fall within at least one of the following categorisations: inside processor metrics; inside memory metrics; inside disk metrics; and inside network metrics.

The metrics obtained from the monitoring system may be used by root-cause error identification to determine potential problem situations in or affecting the virtual application environment.

The manager program may provide for an administrator to select those metrics to form the various sets of metrics monitored by the agent program, vm agent program and application agent program, as appropriate. Further, the manager program may provide for the administrator to select the amount of time which is to elapse for each selected metric before that metric is re-assessed by the agent program, vm agent program and/or application agent program, as appropriate.

The administrator may also be able to enter connection details in respect of each virtual machine to the manager program, the manager program thereafter operable to communicate such connection details to the appropriate agent program to allow them to connect to such virtual machines.

After communicating the appropriate set of metrics or assessment thereof to the manager program, the manager program and each agent program, vm agent program or application agent program, as appropriate, may execute a validation process to determine whether the configuration the manager program operates under is the same as the configuration the agent program, vm agent program or application agent program, as appropriate, operates under. This validation process may include comparing the timestamp of the configuration the manager program operates under with the timestamp of the configuration the agent program, vm agent program or application agent program, as appropriate, operates under.

To provide as complete a view of the virtual application environment as possible, it is preferable that he first set of metrics also include metrics relating to the performance of the physical machine on which the agent program which records the first set of metrics operates.

In accordance with a second aspect of the invention there is a method of monitoring a virtual application environment comprising the steps of:
  obtaining a first set of metrics including metrics in respect of each virtual machine from an operating system of a physical machine hosting such virtual machines;
  connecting, in turn, to a second operating system of each virtual machine hosted on the physical machine; AND
  obtaining a second set of metrics in respect of the virtual machine from the second operating system.

The method may include the step of connecting, in turn, to each physical machine.

The method may also include the step of obtaining a third set of metrics in respect of a pre-determined application running on one or more of the virtual machines.

In situations where a virtual machine is acting as a virtual server for at least one virtual desktop, the method can also include the additional steps of:
  connecting to each virtual desktop hosted by the virtual machine; and
  obtaining a fourth set of metrics in respect of the virtual desktop.

Preferably, the method further includes the step of assessing each metric in the respective sets of metrics.

The method can include the step of performing root-cause error identification techniques in respect of the various sets of metrics obtained.

The method may also include the step of allowing an administrator to select those metrics to form the various sets of metrics to be monitored. Similarly, the method may allow the administrator to select the amount of time which is to elapse for each selected metric before a value for that metric is again obtained. Yet further, the method may allow the administrator to enter connection details in respect of each virtual machine to be connected to.

The method may also include the step of executing a validation process to determine whether the various sets of metrics to be obtained has changed and, if so, to ensure that further repetitions of the method obtain the various sets of metrics as newly defined.

In accordance with a third aspect of the present invention there is an agent program for monitoring a virtual application environment, where the agent program is operable to obtain a first set of metrics from a first operating system executing on a physical machine, such first set of metrics including metrics in respect of each virtual machine as viewed by the first operating system, and operable to connect to a second operating system executing on a virtual machine, the agent program thereafter operable to obtain a second set of metrics in respect of the virtual machine from the second operating system and communicate the first and second sets of metrics to a manager program.

In a variation on the third aspect of the present invention there is an agent program for monitoring a virtual application environment, where the agent program is operable to connect to each physical machine in the virtual application environment in turn to obtain a first set of metrics from a first operating system executing thereon, such first set of metrics including metrics in respect of each virtual machine hosted by the physical machine as viewed by the first operating system and operable to connect to a second operating system executing on each virtual machine hosted by the physical machine and obtain a second set of metrics in respect of the virtual machine from the second operating system, the agent program further operable to communicate the first and second sets of metrics to a manager program.

In accordance with a further aspect of the invention, there is a computer program product able to implement the method and/or system described in the prior aspects of the invention.

BRIEF DESCRIPTION OF THE DRAWINGS

The invention will now be described, by way of example only, with reference to the accompanying drawings, in which.

DETAILED DESCRIPTION OF SPECIFIC EMBODIMENTS OF THE INVENTION

Figure 1:
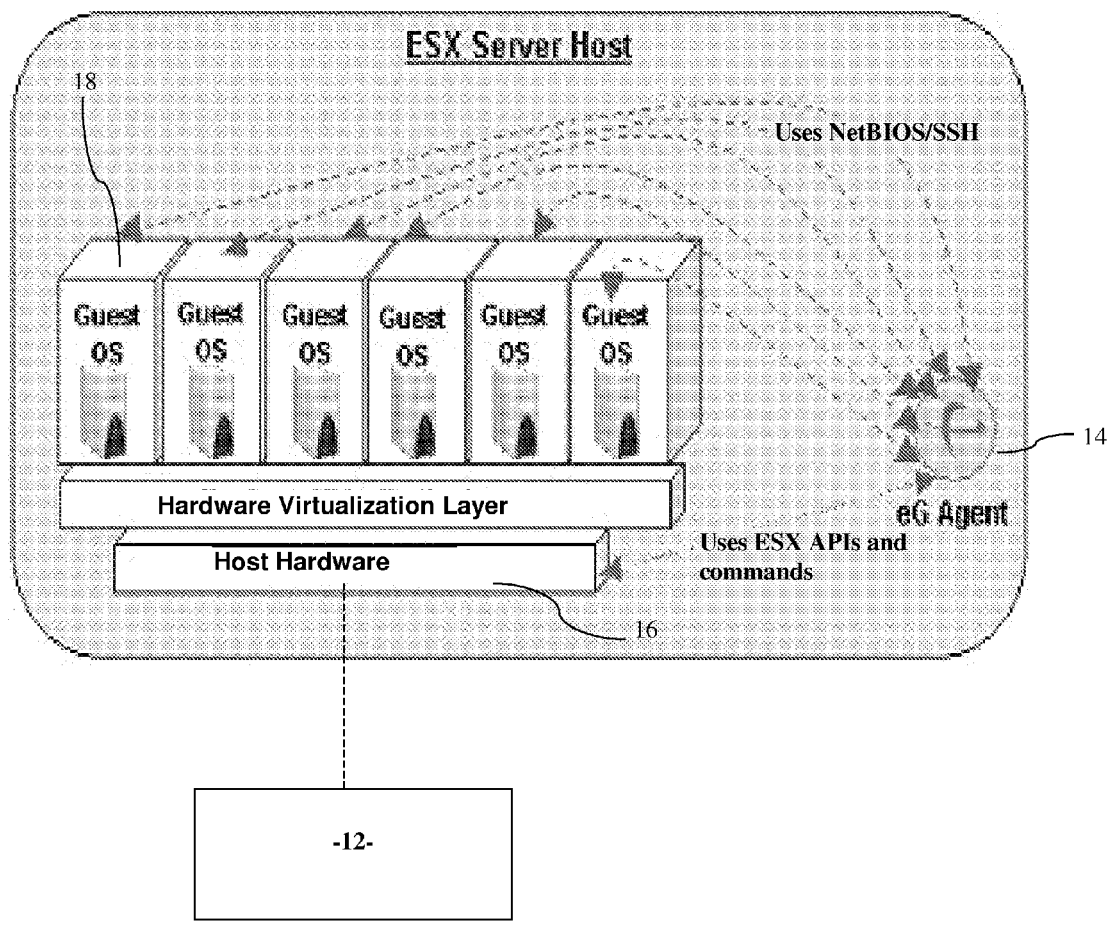
FIG. 1 is a schematic diagram of the components of a monitoring system according to the present invention.

In accordance with a first, preferred embodiment of the invention there is a monitoring system for virtual application environments 10. The monitoring system 10 comprises a manager program 12 and at least one agent program 14. The manager program 12 takes the form of object code able to be executed on one of the at least one physical computer systems 16. Each agent program 14 takes the form of object code able to be executed on a physical computer system 16 to which it is deployed.

In this embodiment, the virtual machines 18 to be monitored have been created on the physical computer systems 16 using the VMware virtualisation software developed by VMWare, Inc of Palo Alto, Calif.

Figure 2:
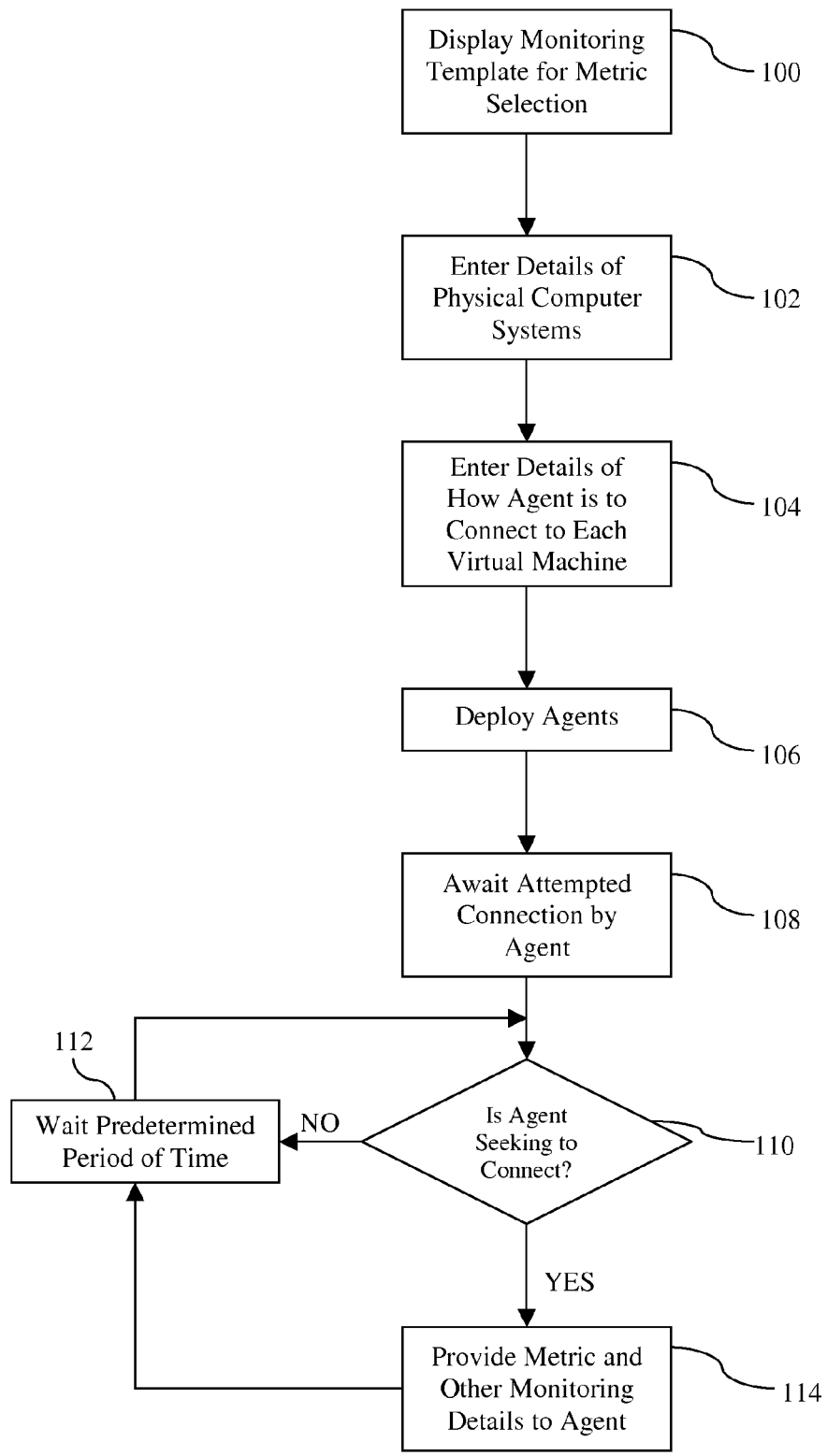
FIG. 2 is a flowchart of a configuration process for a first aspect of a monitoring system according to the present invention.
Figure 3:
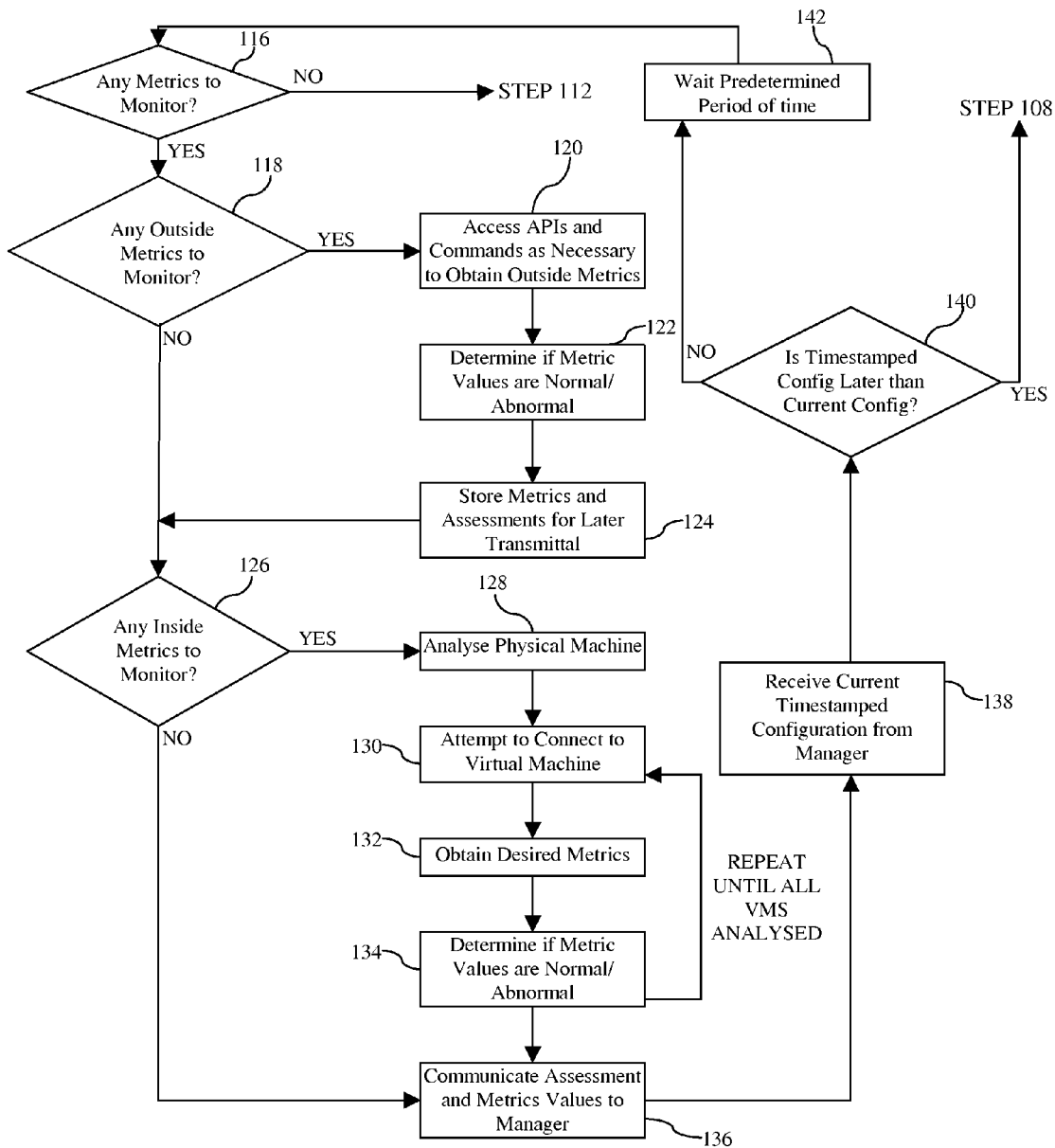
FIG. 3 is a flowchart of a monitoring process for the first aspect of the monitoring system illustrated in FIG. 2.
Figure 4:
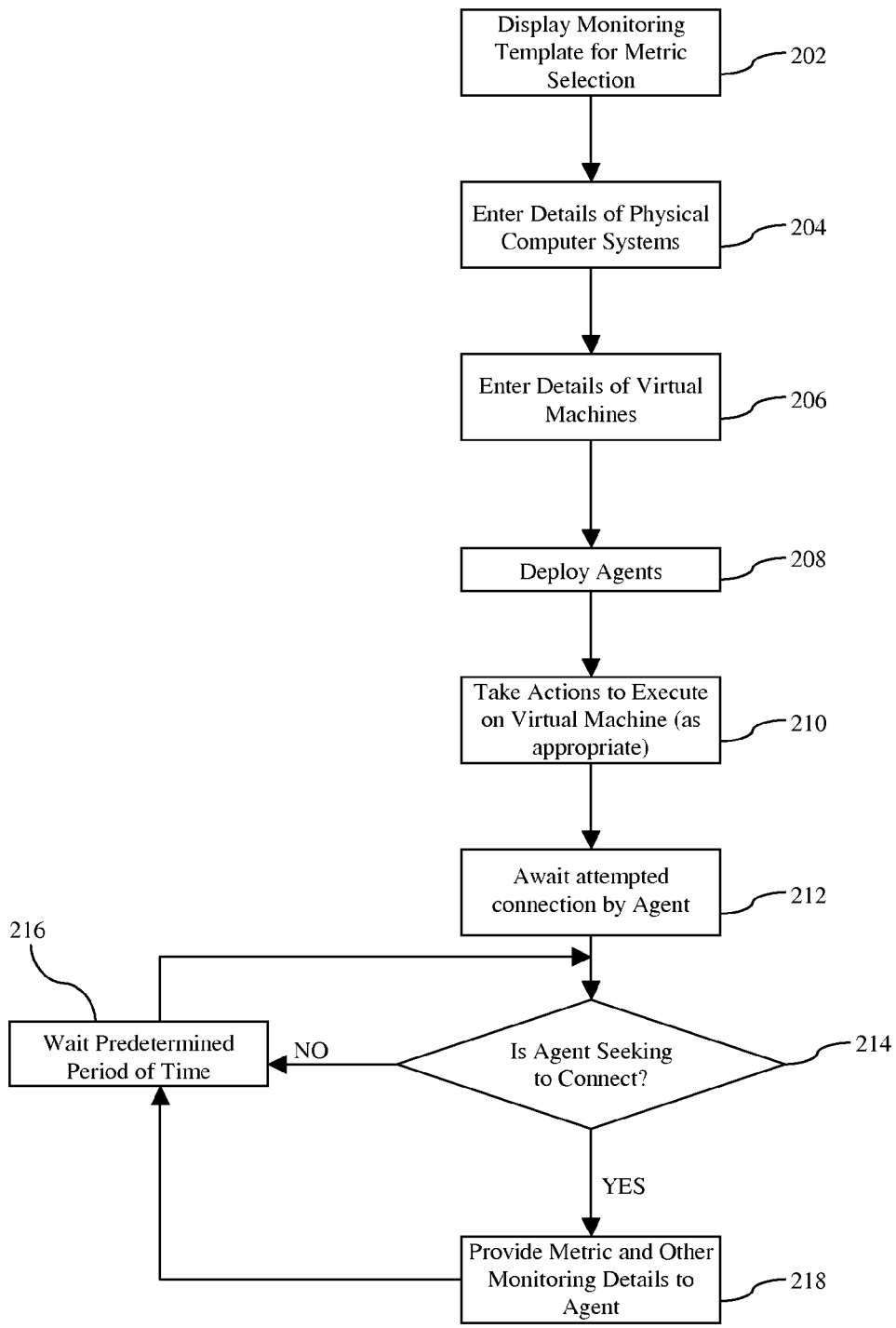
FIG. 4 is a flowchart of a configuration process for a second aspect of a monitoring system according to the present invention.
Figure 5:
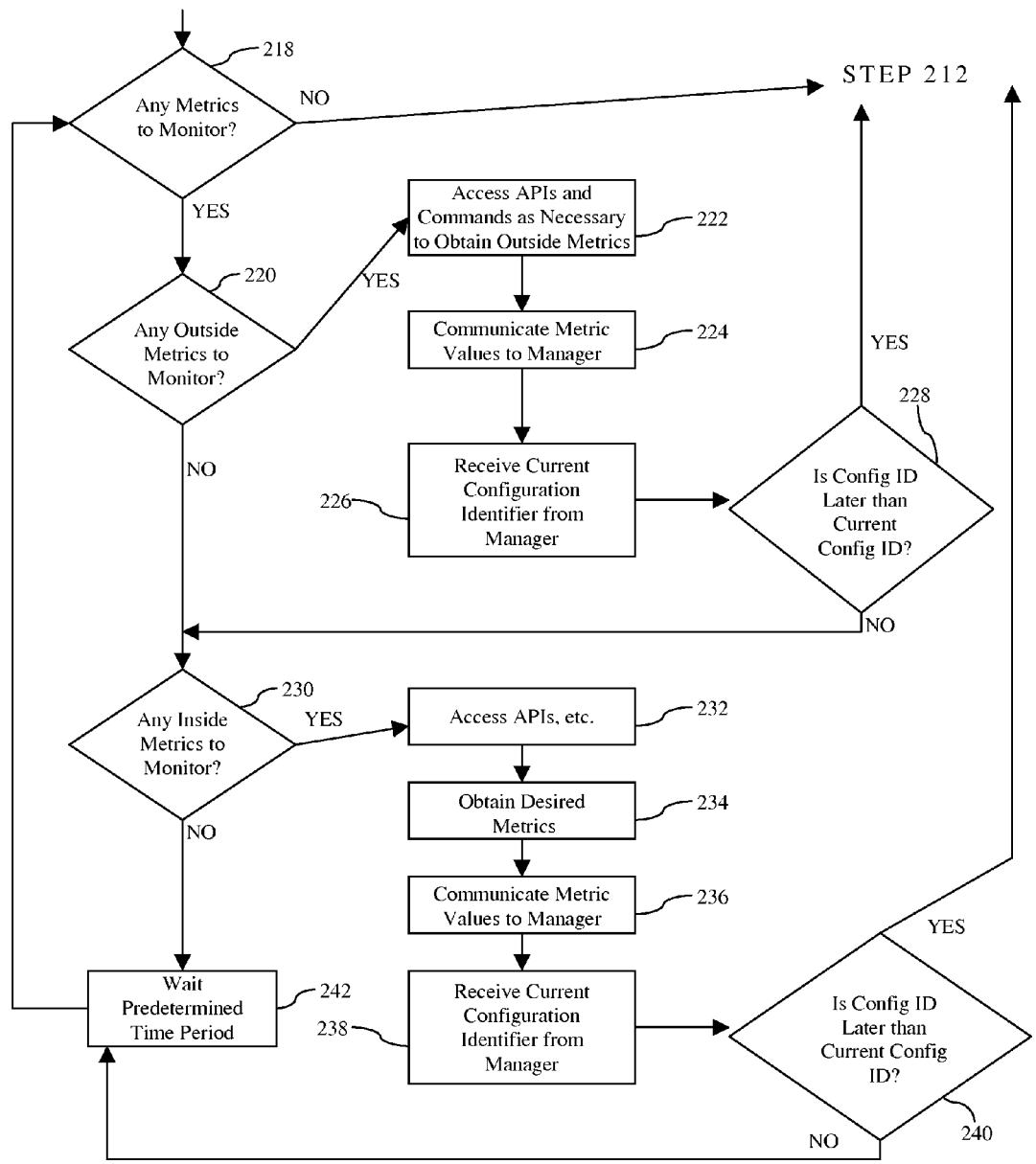
FIG. 5 is a flowchart of a monitoring process for a second aspect of the monitoring system illustrated in FIG. 4.
Figure 6:
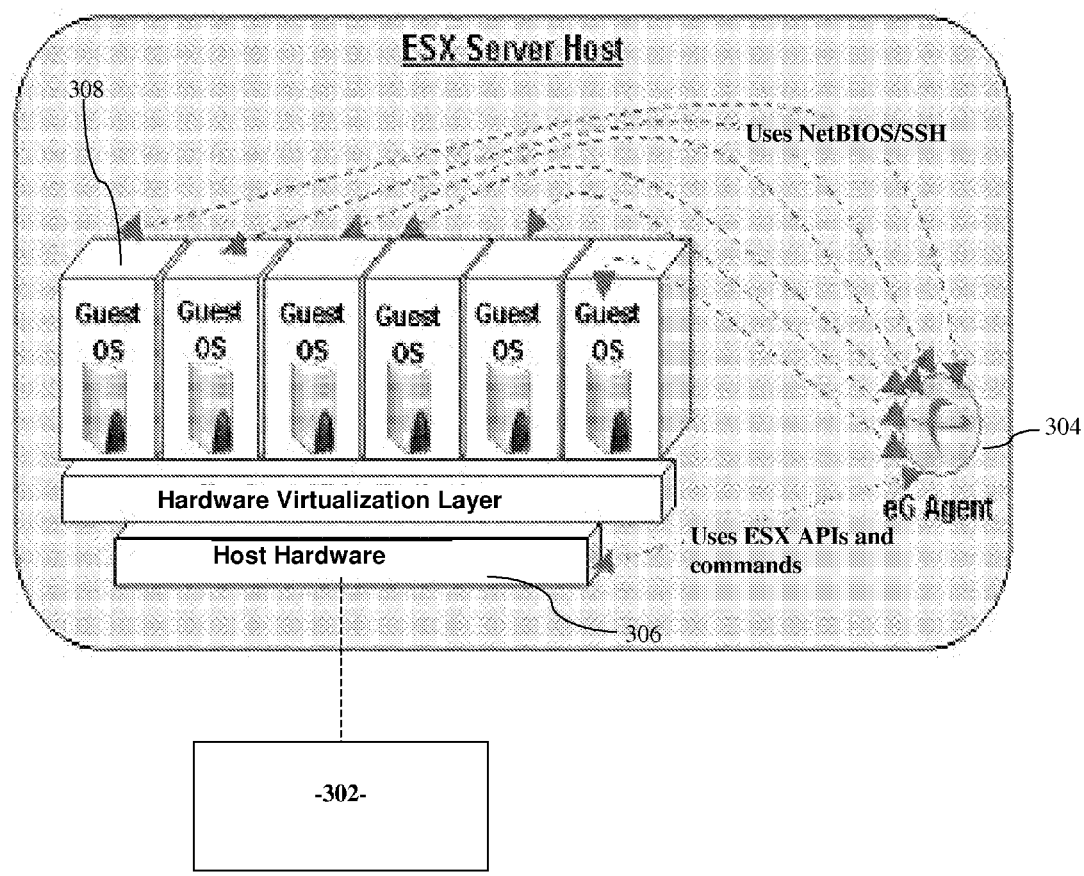
FIG. 6 is a schematic diagram of the components of a monitoring system according to a third aspect of the present invention.

The operations and functions of the monitoring system 10 will now be described in the context of its intended use as shown in the flowcharts forming FIGS. 2 and 3. In this respect it is understood that the person skilled in the art can generate appropriate program source code to perform the described operations and functions.

On initial execution of the manager program 12, the manager program operates to display a monitoring template (step 100). The monitoring template provides details of a range of metrics to be collected in respect of:

the physical computer system(s) 16 to be monitored; AND
virtual machines 18 to be monitored.

An administrator (not shown) is then able to set appropriate values or value ranges for each of the metrics displayed by the monitoring template which the administrator desires to monitor through the monitoring system 10. (It should be appreciated that for certain metrics a value or value range may not be required, the metric being either monitored or not monitored as required by the administrator). At the same time, the administrator is able to set the periodical intervals for obtaining each such metric. If the administrator does not set a periodical interval for obtaining a metric to be monitored, the system will operate to collect that metric at default intervals.

Once the administrator has set and confirmed values/value ranges for their desired metrics, the administrator is prompted to provide details of the physical computer system(s) 16 to be monitored (step 102). The details to be provided in respect of each physical computer system 16 must be sufficient for the manager program 12 to identify the physical computer system's 16 location on a network.

As each new physical computer system 16 is identified, the administrator is prompted to enter in details of how a deployed agent program 14 should connected with virtual machines 18 hosted by the physical computer system 16 (step 104). In this example, the administrator provides the username and password for an administrator account set up on the virtual machine 18.

Agent programs 14 are then deployed to each physical computer system 16 not already having an agent program 14 deployed thereon (step 106). Those agent programs 14 already deployed and those agent programs 14 being deployed may then connect to the manager program 12 in their own time (step 108).

The manager program 12 maintains a detection loop process to determine whenever an agent program 14 is seeking to connect to it. The detection loop process commences with decision step 110 where a check is made to determine whether an agent program 14 is seeking to connect with the manager program 12. If no agent program 14 is seeking to connect with the manager program 12, the manager program 12 waits a predetermined period of time (step 112) before returning to decision step 110. Alternatively, if an agent program 14 is seeking to connect with the manager program, the manager program 12 and agent program 14 establish a data communication link. The manager program 12 then sends (at step 114), by way of the data communication link, details of:

the metrics the agent is to collect;
the values/value ranges for such metrics (if any);
the predetermined time period to wait between obtaining the metrics; AND
the method by which the agent program 14 is to connect to a virtual machine it is to monitor (if any).

Once sent, the manager program 12 moves to step 112 where it waits a predetermined period of time before returning to decision step 110.

Once all agent programs 14 have connected to the manager program 12 in this manner, configuration of the monitoring system 10 is concluded.

Operation of the monitoring system 10 commences with each agent program 14 checking, at decision step 116, whether it has any metrics to monitor. If not, processing is returned to step 112. If so, processing continues to step 118.

At step 118, the agent program 14 assesses whether one or more of the metrics to be monitored is an outside monitor metric. If so, then processing continues to step 120. If not, processing continues at step 126.

On determining that one or more of the metrics to be monitored is an outside monitor metric, the agent program 14 accesses a variety of application programmable interfaces ("APIs") and executes a variety of commands on the physical computer system 16 to which it has been deployed to obtain the required metrics (step 120). Of course, if either the APIs and commands or the physical computer system 16 has access controls placed on them, the agent program 14 operates to provide the information to allow access as has been provided to it by the manager program 12 during configuration.

In this embodiment, the outside metrics are obtained by the agent program executing the "esxtop" command through the VMware program. The esxtop command runs for a small time window in which it obtains metrics in respect of the performance of the physical machine 16 and the outside performance of the virtual machines 18. The output from this command provides a range of metrics. For instance:

the % USED column of the esxtop output table indicates the percentage of the physical machine's 16 CPU used by each virtual machine;

the % SYS column of the esxtop output table reports the percentage of time spent in the operation system kernel for the physical machine and each virtual machine;

the % WAIT column denotes the time a virtual machine is idle or waiting for an interrupt;

Each line of the network metrics reported by the esxtop output table corresponds to a network interface configured for the virtual machine 18. In this context, the "USED BY" column of the network metrics output denotes the virtual machine to which the network interface is mapped to. The "PTTX/s" column indicates the packets per second sent on an interface, while the MbTX/s column indicates the data transmitted in Megabits per second; AND Each line of the memory metrics reported by the esxtop output table corresponds to a virtual machine. In this context, the "MEMSZ" column indicates the memory currently allocated to each virtual machine". The "SZTGT" column indicates the target size of memory that the virtual machine desires. "The % ACTV" column indicates the percentage of allocated memory that is active.

The metrics obtained at step 120 are then compared to the value or value ranges provided for such metrics by the manager program 12 during configuration (step 122). Those metrics that have a measured value equal to the provided value or within the provided value range are then assigned the status of normal. Those metrics having a measured value not equal to the provided value or outside of the provided value range are then assigned the status or abnormal. This assessment, and the metric values are then stored by the agent program 14 for later transmittal to the manager program 12 (Step 124).

At step 126, the agent program 14 assesses whether one or more of the metrics to be monitored is an inside monitor metric. If so, then processing continues to step 128. If not, proceeding continues to step 136.

Step 128 sees the agent program 14 analyse, in turn, each virtual machine 18 hosted on the physical computer system 16 to which it has been deployed. This analysis commences with the agent program 14 attempting to connect to the virtual machine 18 (step 130). In this respect, if the virtual machine 18 is running a Microsoft Windows™ operating system, the attempted connection is through the file/print sharing service. Alternatively, if the virtual machine is running a Unix™ operating system, the attempted connection is through the secure shell service. Like with the physical machine, if the virtual machine has access controls placed on it, the agent program 14 operates to provide the information to allow access as has been provided to it by the manager program 12 during configuration.

The desired metrics are then obtained at step 132. In relation to this example, in a situation where the virtual machine runs a Windows™-based operating system from Microsoft Inc., Redmond, Seattle, the inside metrics are obtained using the winexe application which connects to the Windows™ virtual machine and executes a set of given commands. These commands include the initiation of separate executable programs as required to obtain metrics in respect of all metric categorisations excepting disk metrics and performance metrics. To collect disk metrics, the Windows Management Instrumentation ("WMI") interface is used. To elaborate, the Scripting.FileSystem object is obtained through this interface and each drive so identified is enumerated. For each enumerated drive, the WMI attributes "TotalSize" and "FreeSpace" are then obtained so that the used space and percentage of used space may be computed.

To collect performance metrics, the Windows™ performance monitor ("perfmon") interface is used. The Process object created by perfmon provides a list of all processes running. The associated Counters object is used to obtain measurements for each process. Monitoring of the CPU usage of a process in this manner is obtained using the "% Processor Time" counter. Monitoring of the number of handles used by a process is obtained using the "Handle Count" counter. The amount of active memory used by a process is obtained using the "Working Set" counter.

Monitoring of page file usage by the virtual operating system is performed using the "Paging File" performance object and its "% Usage" counter.

The metrics obtained at step 132 are then compared to the value or value ranges provided for such metrics by the manager program 12 during configuration (step 134). Those metrics that have a measured value equal to the provided value or within the provided value range are then assigned the status of normal. Those metrics having a measured value not equal to the provided value or outside of the provided value range are then assigned the status or abnormal. This assessment, and the metric values are then stored by the agent program 14 for transmittal to the manager program 12 at step 136.

Step 136 sees the agent program 14 transmit the status of each metric, both inside and outside, and the metric value back to the manager program 12. In response the manager program 12 sends a timestamp of the latest configuration for the monitoring system along with, or in place of, an acknowledgement of the reported data (step 138). If the timestamp of the latest configuration reported by the manager program 12 is later than the timestamp of the configuration the agent program 14 is currently operating under, the agent program 14 operates to download the new configuration by repeating the above methodology from step 108. Alternatively, if the timestamps of the two configurations remain identical, the agent program 14 passes processing to step 142 (step 140).

At step 142, the agent program 14 waits out the predetermined time period specified by the manager program 12 during configuration before returning processing to step 118.

In accordance with a second aspect of the invention, where like numerals reference like parts, there is a monitoring system 200 for virtual application environments. The monitoring system 200 consists of the same components as the first embodiment of the invention and the configuration process remains the same. However, in the second embodiment of the invention, at least some of the agent programs 14 take the form of object code able to be executed on the virtual machines 18 hosted by the physical computer system 16.

On initial execution of the manager program 12, the manager program 12 operates to display a monitoring template (step 202). The monitoring template provides details of a range of metrics to be collected in respect of:
   the physical computer system(s) 16 to be monitored; AND
   virtual machines 18 to be monitored.

An administrator (not shown) is then able to set appropriate values or value ranges for each of the metrics displayed by the monitoring template which the administrator desires to monitor through the monitoring system 10. (It should be appreciated that for certain metrics a value or value range may not be required, the metric being either monitored or not monitored as required by the administrator). At the same time, the administrator is able to set the periodical intervals for obtaining each such metric. If the administrator does not set a periodical interval for obtaining a metric to be monitored, the system will operate to collect that metric at default intervals.

Once the administrator has set and confirmed values/value ranges for their desired metrics, the administrator is prompted to provide details of the physical computer system(s) 16 to be monitored (step 204). The details to be provided in respect of each physical computer system 16 must be sufficient for the manager program 12 to identify the physical computer system's 16 location on a network. Once the details in respect of each physical computer system 16 to be monitored has been entered, the administrator is prompted to provide details of all virtual machines 18 to be monitored on that physical computer system (step 206). The details to be provided in respect of each virtual machine 18 must be sufficient for the manager program 12 to identify the virtual machine 18 and allow a deployed agent program 14 to execute on the virtual machine 18.

Agent programs 14 are then deployed to each physical computer system 16 and each virtual machine 18 not already having an agent program 14 deployed thereon (step 208). In the case of agent programs 14 deployed to virtual machines, the agent program 14 takes such steps as indicated by the administrator as necessary to allow the agent program 14 to execute on that virtual machine 18 (step 210). Those agent programs 14 already deployed and those agent programs 14 being deployed may then connect to the manager program in their own time (step 212).

The manager program 12 maintains a detection loop process to determine whenever an agent program 14 is seeking to connect to it. The detection loop process commences with decision step 214 where a check is made to determine whether an agent program 14 is seeking to connect with the manager program 12. If no agent program 14 is seeking to connect with the manager program 12, the manager program 12 waits a predetermined period of time (step 216) before returning to decision step 214. Alternatively, if an agent program 14 is seeking to connect with the manager program, the manager program 12 and agent program 14 establish a data communication link. The manager program 12 then sends (at step 218), by way of the data communication link, details of:
   the metrics the agent is to collect;
   the values/value ranges for such metrics (if any);
   the predetermined time period to wait between obtaining the metrics; AND
   the method by which the agent program 14 is to execute on the virtual machine it is to monitor (if applicable).

Once sent, the manager program 12 moves to step 216 where it waits a predetermined period of time before returning to decision step 214.

Once all agent programs 14 have connected to the manager program 12 in this manner, configuration of the monitoring system 200 is concluded.

Operation of the monitoring system 200 commences with each agent program 14 checking, at decision step 218, whether it has any metrics to monitor. If not, processing is returned to step 216. If so, processing continues to step 220.

At step 220, the agent program 14 assesses whether one or more of the metrics to be monitored is an outside monitor metric. If so, then processing continues to step 222. If not, processing continues at step 230.

On determining that one or more of the metrics to be monitored is an outside monitor metric, the agent program 14 accesses a variety of APIs and executes a variety of commands on the physical computer system 16 to which it has been deployed to obtain the required metrics (step 224). Of course, if either the APIs and commands or the host machine has access controls placed on them, the agent program 14 operates to provide the information to allow access as has been provided to it by the manager program 12 during configuration.

As a detailed description of how to obtain such metrics using APIs and commands has been provided in the first embodiment of the invention, it will not be repeated here.

The values obtained for each required metric are then transmitted by the agent program 14 (step 224). In response the manager program 12 sends an identifier representative of the latest configuration for the monitoring system along with, or in place of, an acknowledgement of the reported data (step 226). If the identifier of the latest configuration reported by the manager program 12 is later than the identifier of the configuration the agent program 14 is currently operating under, the agent program 14 operates to download the new configuration by repeating the above methodology from step 212. Alternatively, if the timestamps of the two configurations remain identical, the agent program 14 passes processing to step 230 (step 228).

At step 230, the agent program 14 assesses whether one or more of the metrics to be monitored is an inside monitor metric. If so, then processing continues to step 232. If not, proceeding continues to step 242.

At step 232, the agent program 14 accesses a variety of APIs and executes a variety of commands on the virtual machine 18 to which it has been deployed to obtain the required metrics. Of course, if either the APIs and commands or the virtual machine 18 has access controls placed on them, the agent program 14 operates to provide the information to allow access as has been provided to it by the manager program 12 during configuration.

The desired metrics are then obtained at step 234 in the same manner as described in the first embodiment of the invention.

The values obtained for each required metric are then transmitted by the agent program 14 (step 236). In response the manager program 12 sends an identifier representative of the latest configuration for the monitoring system along with, or in place of, an acknowledgement of the reported data (step 238). If the identifier of the latest configuration reported by the manager program 12 is later than the identifier of the configuration the agent program 14 is currently operating under, the agent program 14 operates to download the new configuration by repeating the above methodology from step 212. Alternatively, if the timestamps of the two configurations remain identical, the agent program 14 passes processing to step 242 (step 240).

At step 242, the agent program 14 waits out the predetermined time period specified by the manager program 12 during configuration before returning processing to step 218.

In accordance with a third embodiment of the invention, where like numerals reference like parts, there is a monitoring system 300 for virtual application environments. The monitoring system 300 comprises a manager program 302 and a single agent program 304. The manager program 302 and the agent program 304 each take the form of object code able to be executed on a stand-alone system 310.

In this embodiment, virtual machines 308 to be monitored have been created on physical computer systems 306 using the VMware virtualisation software developed by VMWare, Inc of Palo Alto, Calif.

Figure 7:
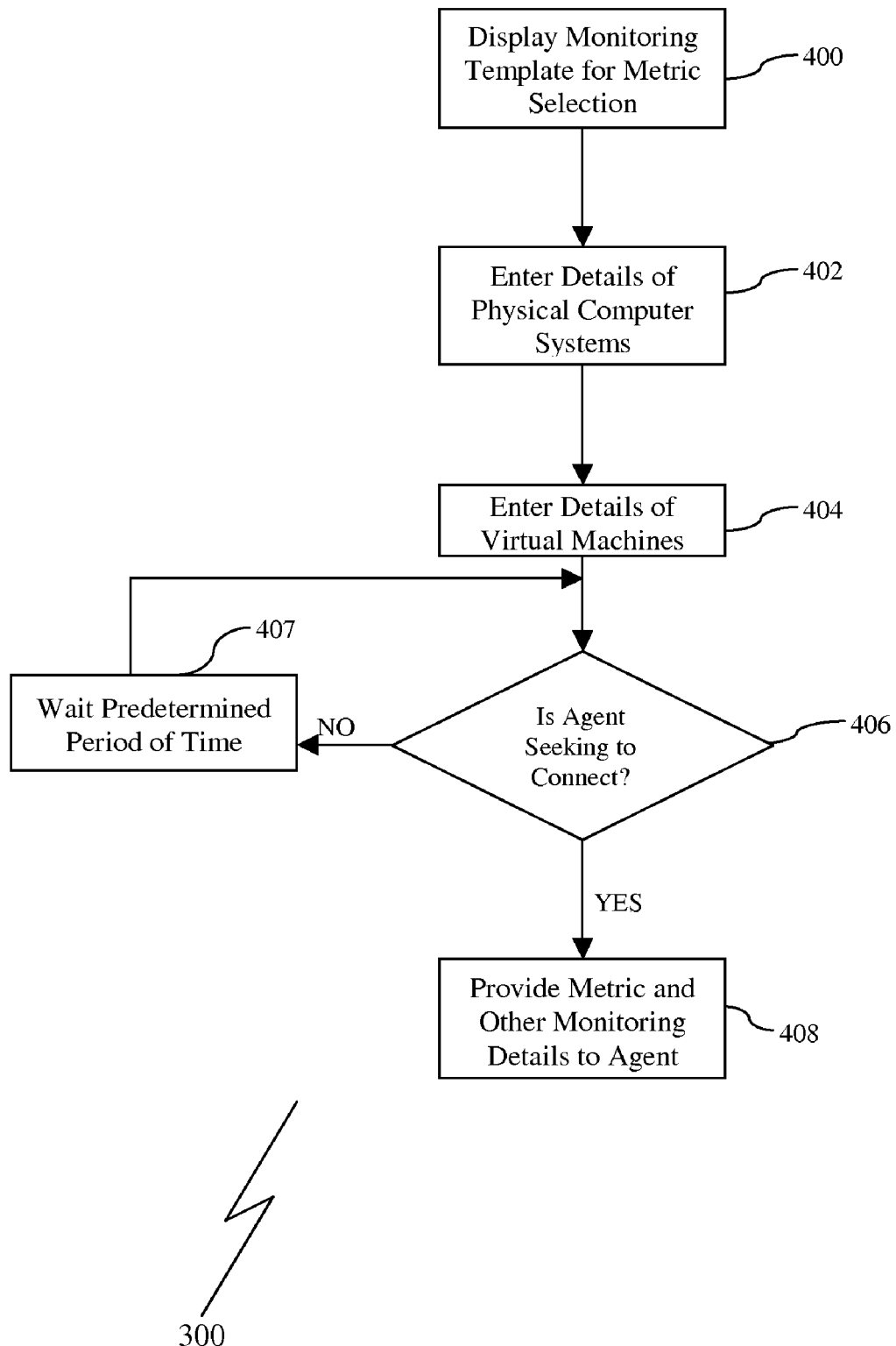
FIG. 7 is a flowchart of a configuration process for a third aspect of a monitoring system according to the present invention.
Figure 8:
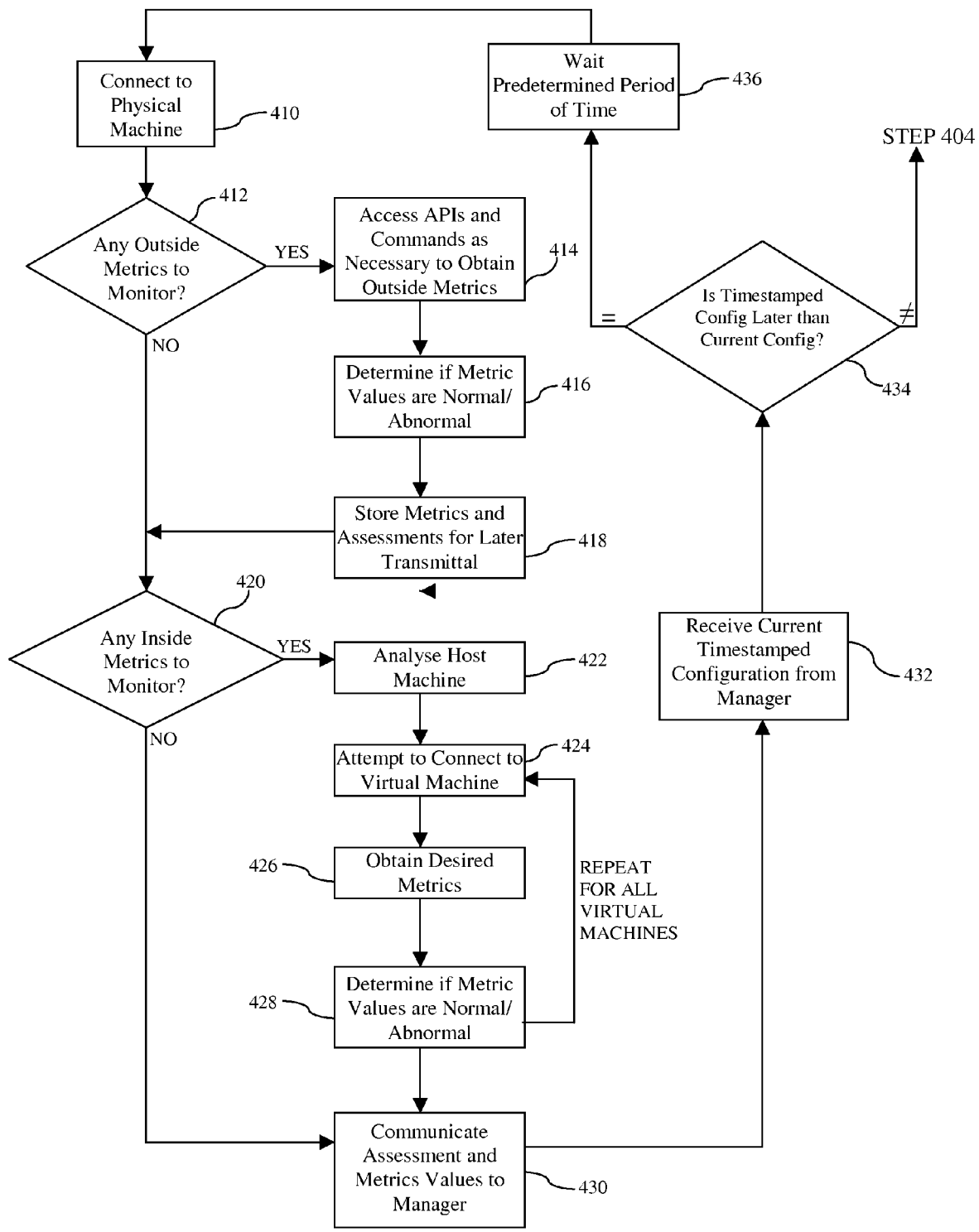
FIG. 8 is a flowchart of a monitoring process for a third aspect of the monitoring system illustrated in FIG. 6.

The operations and functions of the monitoring system 300 will now be described in the context of its intended use as shown in the flowcharts forming FIGS. 7 and 8. In this respect it is understood that the person skilled in the art can generate appropriate program source code to perform the described operations and functions.

On initial execution of the manager program 302, the manager program operates to display a monitoring template (step 400). The monitoring template provides details of a range of metrics to be collected in respect of:
the physical computer system(s) 306 to be monitored; AND
virtual machines 308 to be monitored.

An administrator (not shown) is then able to set appropriate values or value ranges for each of the metrics displayed by the monitoring template which the administrator desires to monitor through the monitoring system 10. (It should be appreciated that for certain metrics a value or value range may not be required, the metric being either monitored or not monitored as required by the administrator). At the same time, the administrator is able to set the periodical intervals for obtaining each such metric. If the administrator does not set a periodical interval for obtaining a metric to be monitored, the system will operate to collect that metric at default intervals.

Once the administrator has set and confirmed values/value ranges for their desired metrics, the administrator is prompted to provide details of the physical computer system(s) 306 to be monitored (step 402). The details to be provided in respect of each physical computer system 306 must be sufficient for the manager program 302 to identify the physical computer system's 306 location on a network.

As each new physical computer system 306 is identified, the administrator is prompted to enter in details of how a deployed agent program 304 should connect with virtual machines 308 hosted by the physical computer system 306 (step 404). In this example, the administrator provides the username and password for an administrator account set up on the virtual machine 308.

The manager program 302 maintains a detection loop process to determine whenever the agent program 304 is seeking to connect to it. The detection loop process commences with decision step 406 where a check is made to determine whether the agent program 304 is seeking to connect with the manager program 302. If the agent program 304 is not seeking to connect with the manager program 302, the manager program 302 waits a predetermined period of time (step 407) before returning to decision step 404. Alternatively, if the agent program 304 is seeking to connect with the manager program, the manager program 302 and agent program 304 establish a data communication link. The manager program 302 then sends (at step 408), by way of the data communication link, details of:
the metrics the agent is to collect;
the values/value ranges for such metrics (if any);
the predetermined time period to wait between obtaining the metrics; AND
the method by which the agent program 304 is to connect to each virtual machine it is to monitor.

Operation of the monitoring system 300 commences with the agent program 304 connecting to a first physical computer system 306 (step 410). The agent program 304 then assesses whether one or more of the metrics to be monitored is an outside monitor metric (step 412). If so, processing continues to step 414. If not, processing continues at step 420.

On determining that one or more of the metrics to be monitored is an outside monitor metric, the agent program 304 accesses a variety of application programmable interfaces ("APIs") and executes a variety of commands on the physical computer system 306 to which it has been deployed to obtain the required metrics (step 414). Of course, if either the APIs and commands or the physical computer system 306 has access controls placed on them, the agent program 304 operates to provide the information to allow access as has been provided to it by the manager program 302 during configuration.

In this embodiment, as with the prior embodiments, the outside metrics are obtained by the agent program executing the "esxtop" command through the VMware program. The esxtop command runs for a small time window in which it obtains metrics in respect of the performance of the physical machine 306 and the outside performance of the virtual machines 308. The output from this command provides a range of metrics. For instance:
the % USED column of the esxtop output table indicates the percentage of the physical machine's 306 CPU used by each virtual machine;
the % SYS column of the esxtop output table reports the percentage of time spent in the operation system kernel for the physical machine and each virtual machine;
the % WAIT column denotes the time a virtual machine is idle or waiting for an interrupt;
Each line of the network metrics reported by the esxtop output table corresponds to a network interface configured for the virtual machine 308. In this context, the "USED BY" column of the network metrics output denotes the virtual machine to which the network interface is mapped to. The "PTTX/s" column indicates the packets per second sent on an interface, while the MbTX/s column indicates the data transmitted in Megabits per second; AND
Each line of the memory metrics reported by the esxtop output table corresponds to a virtual machine. In this context, the "MEMSZ" column indicates the memory currently allocated to each virtual machine". The "SZTGT" column indicates the target size of memory that the virtual machine desires. "The % ACTV" column indicates the percentage of allocated memory that is active.

The metrics obtained at step 414 are then compared to the value or value ranges provided for such metrics by the manager program 302 during configuration (step 416). Those metrics that have a measured value equal to the provided value or within the provided value range are then assigned the status of normal. Those metrics having a measured value not equal to the provided value or outside of the provided value range are then assigned the status or abnormal. This assessment, and the metric values are then stored by the agent program 304 for later transmittal to the manager program 302 (Step 418).

At step 420, the agent program 304 assesses whether one or more of the metrics to be monitored is an inside monitor metric. If so, then processing continues to step 422. If not, proceeding continues to step 430.

Step 422 sees the agent program 304 analyse, in turn, each virtual machine 308 hosted on the physical computer system 306 to which it is presently connected. This analysis commences with the agent program 304 attempting to connect to the virtual machine 308 (step 424). In this respect, if the virtual machine 308 is running a Microsoft Windows™ operating system, the attempted connection is through the file/print sharing service. Alternatively, if the virtual machine is running a Unix™ operating system, the attempted connection is through the secure shell service. Like with the physical machine, if the virtual machine has access controls placed on it, the agent program 304 operates to provide the information to allow access as has been provided to it by the manager program 302 during configuration.

The desired metrics are then obtained at step 426. In relation to this example, in a situation where the virtual machine runs a Windows™-based operating system from Microsoft Inc., Redmond, Seattle, the inside metrics are obtained using the winexe application which connects to the Windows™ virtual machine and executes a set of given commands. These commands include the initiation of separate executable programs as required to obtain metrics in respect of all metric categorisations excepting disk metrics and performance metrics. To collect disk metrics, the Windows Management Instrumentation ("WMI") interface is used. To elaborate, the Scripting.FileSystem object is obtained through this interface and each drive so identified is enumerated. For each enumerated drive, the WMI attributes "TotalSize" and "FreeSpace" are then obtained so that the used space and percentage of used space may be computed.

To collect performance metrics, the Windows™ performance monitor ("perfmon") interface is used. The Process object created by perfmon provides a list of all processes running. The associated Counters object is used to obtain measurements for each process. Monitoring of the CPU usage of a process in this manner is obtained using the "% Processor Time" counter. Monitoring of the number of handles used by a process is obtained using the "Handle Count" counter. The amount of active memory used by a process is obtained using the "Working Set" counter.

Monitoring of page file usage by the virtual operating system is performed using the "Paging File" performance object and its "% Usage" counter.

The metrics obtained at step 426 are then compared to the value or value ranges provided for such metrics by the manager program 302 during configuration (step 428). Those metrics that have a measured value equal to the provided value or within the provided value range are then assigned the status of normal. Those metrics having a measured value not equal to the provided value or outside of the provided value range are then assigned the status or abnormal. This assessment, and the metric values are then stored by the agent program 304 for transmittal to the manager program 302 at step 430.

Step 430 sees the agent program 304 transmit the status of each metric, both inside and outside, and the metric value back to the manager program 302 along with details of the physical computer system 306 that the agent program 304 is presently connected to. In response the manager program 302 sends a timestamp of the latest configuration for the monitoring system along with, or in place of, an acknowledgement of the reported data (step 432). If the timestamp of the latest configuration reported by the manager program 302 is later than the timestamp of the configuration the agent program 304 is currently operating under, the agent program 304 operates to download the new configuration by repeating the above methodology from step 404. Alternatively, if the timestamps of the two configurations remain identical, the agent program 304 passes processing to step 436 (step 434).

At step 436, the agent program 304 checks to see whether metrics have been obtained from each physical computer system 306 it has been set to monitor. If not, processing returns to step 410 where the next physical computer system 306 to be monitored by the agent program 304 is processed as set out above. However, if the agent program 304 has obtained metrics from each physical computer system 306 it has been set to monitor, processing continues to step 438.

At step 438, the agent program 304 waits out the predetermined time period specified by the manager program 302 during configuration before returning processing to step 410 and obtaining the metrics in respect of each physical computer system 306 all over again.

The metrics received in accordance with the embodiments described above can then be subjected to an error-identification technique such as the one developed by the applicant which is the subject of a separate application of the same priority date.

In the embodiments described above illustrative examples of the metrics that can be obtained through the present invention have been described. However, the person skilled in the art would readily appreciate that these are not the only metrics that can be obtained using the present invention. In fact, additional metrics can be obtained that fall within the following broad categorisations:

Physical Machine Processor Metrics. Metrics that fall within this categorisation include CPU utilisation rates (on a per processor basis), the instantaneous number of processes queued up waiting for a processor and the current number of processes running on the physical machine.

Physical Machine Memory Metrics. These include metrics relating to the total amount of memory and the amount of free memory available on the physical machine.

Physical Machine Disk Metrics. For instance, the number of different disk partitions on the physical machine, the space usage levels of each such disk partition and the amount for free space available for each disk.

Physical Machine Transmission Control Protocol ("TCP") Metrics. Such metrics relate to the rate of connections to and from the physical machine, the percentage of re-transmissions happening from the physical machine and the instantaneous number of connections established on the physical machine, amongst others.

Physical Machine Application Process Metrics. Such metrics relate to the what processes are running on the machine, how many instance of each process there are, and about the resource usage levels of these processes.

Physical Machine Network Metrics. Metrics in this category include the number of different network interfaces on the physical machine and a count of the traffic going in and out of each interface of the physical machine. The number of packets queued on each of the interfaces of the physical machine is also a metric that comes within this category.

Outside Processor Metrics for a Virtual Machine. Such metrics include those relating to the percentage of the physical machine's processor cycles that are used by the virtual machine concerned, the percentage of time that the virtual machine is in an idle state and the percentage of time the virtual machine was not allowed to run by the physical machine.

Outside Memory Metrics for a Virtual Machine. Examples of metrics in this category include the percentage of the physical machine's memory that is being used by the virtual machine concerned and the number of memory pages that are swapped out for the virtual machine concerned.

Outside Disk Metrics for a Virtual Machine. The number of queued disk commands for the virtual machine concerned, the number of active disk commands and the number of disk read/write rates, etc. all fall within this categorisation.

Outside Network Metrics for a Virtual Machine. These include details of the network traffic to and from the virtual machine (in bytes and packets per second).

Inside Processor Metrics for a Virtual Machine. Metrics that fall within this categorisation include CPU utilisation rates (on a per virtual processor basis), the instantaneous number of processes queued up waiting for a processor and the current number of processes running on the virtual machine.

Inside Memory Metrics for a Virtual Machine. These include metrics relating to the total amount of memory allocated to a virtual machine and the amount of available memory on the virtual machine.

Inside Process-Related Metrics. These include metrics relating to whether specific processes are running on the physical machine or not, what resources such processes are using. Information may also be collected in respect of those processes that combined use more than a pre-determined amount of the physical machines resources.

Inside Log Information for a Virtual Machine. Information collected in this category includes details of any errors encountered in the operating system or any application running thereon and any attempted breaches of the physical computer system's security systems.

Inside Disk Metrics for a Virtual Machine. For instance, the number of different disk partitions on the virtual machine, the space usage levels of each such disk partition and the amount of free space available for each disk partition.

The above is not considered an exhaustive list and the monitoring of additional metrics not otherwise described as would be known to the person skilled in the art fall within the scope of the present invention. Additionally, it is to be understood that the methods by which such metrics may be obtained is dependent on the operating system and/or virtualisation programs of the physical machine 16 or the virtual machine 18 concerned, as appropriate. Therefore, other methods of obtaining such metrics as dictated by the operating system concerned also fall within the scope of the present invention.

It should be appreciated by the person skilled in the art that the above invention is not limited to the embodiment described. In particular, the following modifications and improvements may be made without departing from the scope of the present invention:

The monitoring system 10 may be modified so that a plurality of manager programs 12 operate in conjunction with one another to provide the required monitoring information. This is particularly desirable in situations where thousands of agent programs 16 have been deployed.

The physical computer system 16 on which the manager program 12 operates need not have an agent program 14 deployed thereon, the monitoring of that particular physical computer system 16 being handled by the manager program 12.

The monitoring system 10 may be modified such that multiple agent programs 14 are used to monitor many virtual machines 18. In a variation of this embodiment, an agent program 14 may be deployed to monitor a set of metrics in respect of a particular application running on a virtual machine 18.

The physical computer systems 16 monitored by the monitoring system may be a collection of servers only some of which host virtual machines.

The virtual machine 18 may be a virtual server providing services to one or more virtual desktops. In this situation, the monitoring system ideally is further adapted to obtain metrics in respect of the virtual desktop.

In situations where the physical computer system has more than one processing unit, the steps taken to obtain the inside metrics may be performed simultaneously with the steps taken to obtain the outside metrics by executing such steps on different processing units.

The monitoring system 10 may be modified such that the agent program 14 only operates to send metric values or data to the manager program 12 on determination that an abnormal metric has been obtained. However, this is not a preferred implementation of the system as a malfunction in an agent program 14 may still result in the manager program deeming the host machine the agent program 14 is set to monitor as functioning correctly (and thereby masking a potential problem).

The monitoring system 10 may be further modified such that a single interval is set by the administrator for the taking of metrics with all metrics operable to be obtained at such interval.

The manual entry of details of the physical computer systems 16 to be monitored by the monitoring system 10 performed at step 102 may be replaced by an automatic detection system performed by the manager program 12. For example, the automatic discovery process may be achieved by way of TCP port checks. However, other means of automatic discovery of such details as the host name and IP address of each physical computer system are considered to be well within the skill of the person skilled in the art and will not be described further here.

The manual entry of details of the virtual machines 18 to be monitored by the monitoring system 200 performed at step 206 may be replaced by an automatic detection system as described in the first embodiment of the invention.

The administrator may manually access the monitoring template at any time and thereby further refine or modify the monitoring system 10 as required to reflect changes in the physical computer systems 16 or virtual machines 18 or changes in the type and extent of information required by the administrator.

Simple Network Management Protocols ("SNMPs") may also be used as a means of obtaining the desired metrics.

The method by which agent programs 14 may be provided with updated configurations by the manager program 12 may vary to that described. For instance, an interrupt system whereby the manager program broadcasts the new configuration to all agent programs 14 on a variation being made to the configuration may be implemented. Alternatively, the agent programs 14 may independently poll the manager program 12 to determine if a flag value is set indicative that a new configuration exists. If so, the agent program 14 can then operate to obtain a copy of the new configuration as described above.

Methods of determining whether a configuration has been changed, other than be comparing timestamps, may be employed in the embodiments described above with minimal adaptation.

The communication link between the agent programs 14 and the manager program 12 need not be a permanent link.

The monitoring system 10 may operate to extend its current configuration to include new physical computer systems 16 as they are discovered. Alternatively, on discovery of a new physical computer system 16, the monitoring system 10 may operate to automatically display the pre-defined template to the administrator for the administrator to set a new configuration (if so required). This alternative may be further restricted only to automatically display the pre-defined template on the discovery of particular types of physical computer systems 16

The agent program 14 may operate to connect to each virtual machine 18 through other means to that described above. For example, the remote exec command could also be used to connect to a virtual machine 18 that has a Unix operating system.

Multiple agent programs 14 may be deployed to the same physical computer system 16 or virtual machine 18. In this manner, each agent program 14 may be designated a specialist role. For example, one agent program 14 may be designated to obtain just the inside metrics and another to obtain just the outside metrics. Alternatively, each agent program 14 may be designated to undertake their own subset of inside and outside metrics.

The manager program 12 need not operate on a physical computer system 16. Instead, the manager program 12 may operate on one of the virtual machines 18 or may take the form of a separate, stand-alone device connected to the data network.

In situations where agent programs 14 are deployed to individual virtual machines, the manager program 12 may keep track of the relationship between such agent programs 14 and the physical machine 16 on which the virtual machine 18 they are monitoring is hosted through a variety of methods. For instance, the manager program 18 may record such details at the time of deployment. Alternatively, the agent programs 16 may communicate details of the physical computer systems 18 on which it is operating at the time of communicating the metric values.

It should be further appreciated by the person skilled in the art that feature disclosed above and in the embodiment described, where not mutually exclusive, may be combined to form yet further embodiments that fall within the scope of the present invention.

We claim:

1. A monitoring system for virtual application environments comprising:
   at least one physical machine executing a first operating system;
   at least one virtual machine operating on at least one of the at least one physical machines, each such virtual machine operating a second operating system; and
   an agent program operating on each of the at least one physical machines and at least one virtual machine agent program operating on a virtual machine hosted by the physical machine,
   where the agent program is operable to, via the first operating system, obtain a first set of metrics regarding each virtual machine, except for virtual machines having a virtual machine agent program operable therewith, the agent program being further operable to connect to, and communicate with, the second operating system of each virtual machine to obtain a second set of metrics regarding each virtual machine, and
   where a virtual machine agent program is operable on a virtual machine, the virtual machine agent program obtains the second set of metrics for the virtual machine on which it operates, the agent program and the virtual machine agent program being further operable to communicate the first and second sets of metrics to a manager program.

2. A monitoring system for virtual application environments according to claim 1, further comprising an application agent program operable to obtain a third set of metrics in respect of a predetermined application running on the virtual machine.

3. A monitoring system for virtual application environments according to claim 2, where the agent program includes the application agent program.

4. A monitoring system for virtual application environments according to claim 1, wherein a virtual machine is acting as a virtual server for at least one virtual desktop, the virtual machine agent program operating on such virtual machine being operable to connect to each virtual desktop and obtaining a fourth set of metrics in respect of the virtual desktop and communicating the fourth set of metrics to the manager program.

5. A monitoring system for virtual application environments according to claim 1, wherein the manager program executes on a physical machine and operates as the agent program on that physical machine.

6. A monitoring system for virtual application environments according to claim 1, where the manager program executes on a stand-alone device in communication with the at least one physical machine.

7. A monitoring system for virtual application environments according to claim 1, where at least one of the agent program and the virtual machine agent program is operable to assess each metric in the first and second sets of metrics and to communicate the assessment of such sets of metrics to the manager program in place of the actual sets of metric values.

8. A monitoring system for virtual application environments according to claim 1, wherein the agent program is operable to transmit only those metrics, if any, of the respective set or sets of metrics obtained by such agent program that have been assessed as abnormal.

9. A monitoring system for virtual application environments according to claim 2, wherein at least one of the agent program, the virtual machine agent program and the application agent program is operable to transmit only those metrics, if any, of the respective set or sets of metrics obtained by such agent program that have been assessed as abnormal.

10. A monitoring system for virtual application environments according to claim 1, where the first set of metrics includes metrics that fall within at least one of the following categorizations: outside processor metrics; outside memory metrics; outside disk metrics; outside network metrics; outside transmission control protocol metrics; outside process-related metrics; and outside log information.

11. A monitoring system for virtual application environments according to claim 1, where the second set of metrics includes metrics that fall within at least one of the following categorizations: inside processor metrics; inside memory metrics; inside disk metrics; and inside network metrics.

12. A monitoring system for virtual application environments according to claim 1, where the manager program is operable to perform root-cause error identification techniques on receipt of the various sets of metrics.

13. A monitoring system for virtual application environments according to claim 1, where the manager program provides for an administrator to select those metrics to form the various sets of metrics monitored by at least one of the agent program and the virtual machine agent program.

14. A monitoring system for virtual application environments according to claim 13, where the manager program provides for the administrator to select the amount of time which is to elapse for each selected metric before that metric is reassessed by at least one of the agent program and the virtual machine agent program.

15. A monitoring system for virtual application environments according to claim 13, where the manager program provides for the administrator to enter connection details in respect of each virtual machine, the manager program operable to communicate such connection details to the appropriate agent program to allow them to connect to such virtual machines.

16. A monitoring system for virtual application environments according to claim 1, where after communicating the appropriate set of metrics to the manager program, the manager program and at least one of each agent program and virtual machine agent program execute a validation process to determine whether the configuration the manager program operates under is the same as the configuration the agent program, virtual machine agent program or application agent program, as appropriate, operates under.

17. A monitoring system for virtual application environments according to claim 16, where the validation process compares a timestamp of the configuration the manager program operates under with a timestamp of the configuration the agent program operates under.

18. A monitoring system for virtual application environment according to claim 1, where the first set of metrics also includes metrics relating to the performance of the physical machine on which the agent program which records the first set of metrics operates.

* * * * *